(12) United States Patent
Ryu et al.

(10) Patent No.: US 11,985,514 B2
(45) Date of Patent: May 14, 2024

(54) DISCONTINUOUS RECEPTION CONFIGURATION IN SIDELINK COMMUNICATION DEPLOYMENTS

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Fairless Hills, PA (US); Tao Luo, San Diego, CA (US); Juan Montojo, San Diego, CA (US); Jelena Damnjanovic, Del Mar, CA (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/443,306

(22) Filed: Jul. 23, 2021

(65) Prior Publication Data

US 2022/0053340 A1 Feb. 17, 2022

Related U.S. Application Data

(60) Provisional application No. 62/706,395, filed on Aug. 13, 2020.

(51) Int. Cl.
| | |
|---|---|
| *H04W 16/18* | (2009.01) |
| *H04W 24/08* | (2009.01) |
| *H04W 72/1273* | (2023.01) |
| *H04W 76/28* | (2018.01) |
| *H04W 92/18* | (2009.01) |

(52) U.S. Cl.
CPC .......... *H04W 16/18* (2013.01); *H04W 24/08* (2013.01); *H04W 72/1273* (2013.01); *H04W 76/28* (2018.02); *H04W 92/18* (2013.01)

(58) Field of Classification Search
None
See application file for complete search history.

(56) References Cited

U.S. PATENT DOCUMENTS

| | | | | |
|---|---|---|---|---|
| 2011/0268004 | A1* | 11/2011 | Doppler | H04W 72/02 370/329 |
| 2013/0136072 | A1* | 5/2013 | Bachmann | H04W 68/00 370/329 |
| 2013/0201920 | A1* | 8/2013 | Takano | H04W 88/16 370/328 |

(Continued)

FOREIGN PATENT DOCUMENTS

| | | | | |
|---|---|---|---|---|
| GB | 2597807 A | * | 2/2022 | ............. H04L 5/003 |
| WO | WO-2018064477 A1 | * | 4/2018 | |

(Continued)

*Primary Examiner* — Jamaal Henson
(74) *Attorney, Agent, or Firm* — Harrity & Harrity, LLP

(57) ABSTRACT

Various aspects of the present disclosure generally relate to wireless communication. In some aspects, a user equipment (UE) may receive information identifying a sidelink discontinuous reception (DRX) configuration, that is different from an access link DRX configuration, associated with operation in a sidelink communication deployment. The UE may monitor a physical downlink control channel (PDCCH) discontinuously using the sidelink DRX configuration. Numerous other aspects are described.

30 Claims, 10 Drawing Sheets

(56) References Cited

U.S. PATENT DOCUMENTS

| | | | | |
|---|---|---|---|---|
| 2013/0297810 | A1* | 11/2013 | Ho | H04W 76/19 |
| | | | | 709/228 |
| 2015/0055532 | A1* | 2/2015 | Lu | H04W 76/28 |
| | | | | 370/311 |
| 2016/0219443 | A1* | 7/2016 | Lee | H04W 24/02 |
| 2016/0286601 | A1* | 9/2016 | Siomina | H04W 76/28 |
| 2016/0338142 | A1* | 11/2016 | Rune | H04W 76/28 |
| 2017/0118792 | A1* | 4/2017 | Rico Alvarino | H04W 76/28 |
| 2017/0230815 | A1* | 8/2017 | Yasukawa | H04W 72/02 |
| 2017/0245319 | A1* | 8/2017 | Yasukawa | H04W 52/0229 |
| 2017/0325167 | A1* | 11/2017 | Lu | H04W 52/0235 |
| 2018/0124864 | A1* | 5/2018 | Lee | H04W 52/0209 |
| 2019/0037534 | A1* | 1/2019 | Yasukawa | H04W 4/40 |
| 2019/0053323 | A1* | 2/2019 | Siomina | H04W 76/28 |
| 2020/0112400 | A1* | 4/2020 | Lee | H04L 1/1819 |
| 2020/0304969 | A1* | 9/2020 | Basu Mallick | H04L 5/0055 |
| 2020/0314819 | A1* | 10/2020 | Loehr | H04W 4/40 |
| 2021/0037468 | A1* | 2/2021 | Huang | H04W 76/23 |
| 2022/0183103 | A1* | 6/2022 | Bao | H04W 72/12 |
| 2022/0312241 | A1* | 9/2022 | Xu | H04L 1/08 |
| 2022/0322486 | A1* | 10/2022 | Park | H04W 76/14 |
| 2022/0369417 | A1* | 11/2022 | Park | H04W 28/0268 |
| 2023/0097552 | A1* | 3/2023 | Freda | H04L 1/1848 |
| | | | | 370/329 |
| 2023/0164768 | A1* | 5/2023 | Park | H04L 1/1812 |
| | | | | 370/329 |
| 2023/0269820 | A1* | 8/2023 | Kang | H04W 72/25 |
| | | | | 370/310 |

FOREIGN PATENT DOCUMENTS

| | | | | |
|---|---|---|---|---|
| WO | WO-2021030832 A1 * | 2/2021 | | H04W 52/0235 |
| WO | WO-2021186730 A1 * | 9/2021 | | H04W 52/0232 |

* cited by examiner

DISCONTINUOUS RECEPTION CONFIGURATION IN SIDELINK COMMUNICATION DEPLOYMENTS

CROSS-REFERENCE TO RELAYED APPLICATION

This patent application claims priority to U.S. Provisional Patent Application No. 62/706,395, filed on Aug. 13, 2020, entitled "DISCONTINUOUS RECEPTION MODE CONFIGURATION IN SIDELINK COMMUNICATION DEPLOYMENTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for discontinuous reception mode configuration in sidelink communication deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

When operating in discontinuous reception (DRX), a user equipment may communicate on a sidelink (e.g., to transmit/receive a physical sidelink control channel (PSCCH), a physical sidelink shared channel (PSSCH), a physical sidelink feedback channel (PSFCH), and/or the like) during a sidelink resource pool. However, in some cases, as a result of a timing of the sidelink resource pool, a user equipment (UE) may be in an inactive time and an inactive mode. As a result, the UE may miss an opportunity for communication on the sidelink. Furthermore, a base station (BS) may not be able to transmit control information to the UE to grant sidelink transmission resources or sidelink reception resources in the sidelink resource pool.

Traffic patterns may be different on an access link relative to a sidelink. For example, an access link may have a relatively heavy traffic pattern, whereas on a sidelink there may be a relatively light traffic pattern. To optimize power consumption, a UE may have longer inactive times when a relatively light traffic pattern is occurring than when a relatively heavy traffic pattern is occurring. Thus, using the access link DRX may result in a UE having power utilization poorly optimized for, for example, a traffic pattern on the sidelink.

Some aspects described herein provide for sidelink (specific) DRX (mode) configuration. For example, in addition to an access link (specific) DRX (mode), the UE may have sidelink DRX configured with sleep periods that do not completely overlap with a sidelink resource time during which the UE can receive grants of sidelink transmission resources or sidelink reception resources. For example, a UE may receive information identifying a sidelink DRX configuration and may operate in DRX in accordance with the sidelink DRX configuration during sidelink resource periods. In this way, the UE may avoid missing an opportunity to receive transmission or reception control information providing a grant of sidelink resources as a result of a mismatch between an access link DRX configuration and a presence of a sidelink resource pool. Moreover, the UE may optimize power consumption to a traffic pattern on a sidelink.

Some aspects described herein relate to a method of wireless communication performed by a UE. The method may include receiving information identifying a sidelink DRX configuration, that is different from an access link DRX configuration, associated with operation in a sidelink communication deployment. The method may include monitoring a PDCCH discontinuously using the sidelink DRX configuration.

Some aspects described herein relate to a method of wireless communication performed by a base station. The method may include transmitting, to a UE, information identifying a sidelink DRX configuration, that is different from an access link DRX configuration, associated with operation in a sidelink communication deployment. The method may include communicating, using a PDCCH, with the UE during UE use of the sidelink DRX configuration.

Some aspects described herein relate to a UE for wireless communication. The UE may include a memory and one or more processors coupled to the memory. The one or more processors may be configured to receive information identifying a sidelink DRX configuration, that is different from an access link DRX configuration, associated with operation in a sidelink communication deployment. The set of instructions, when executed by one or more processors of the UE, may cause the UE to monitor a PDCCH discontinuously using the sidelink DRX configuration.

Some aspects described herein relate to a base station for wireless communication. The base station may include a memory and one or more processors coupled to the memory. The one or more processors may be configured to transmit, to a UE, information identifying a sidelink DRX configuration, that is different from an access link DRX configuration, associated with operation in a sidelink communication deployment. The one or more processors may be configured to communicate, using a PDCCH, with the UE during UE use of the sidelink DRX configuration.

Some aspects described herein relate to a non-transitory computer-readable medium that stores a set of instructions for wireless communication by a UE. The set of instructions, when executed by one or more processors of the UE, may cause the UE to receive information identifying a sidelink DRX configuration, that is different from an access link DRX configuration, associated with operation in a sidelink communication deployment. The set of instructions, when executed by one or more processors of the UE, may cause the UE to monitor a PDCCH discontinuously using the sidelink DRX configuration.

Some aspects described herein relate to a non-transitory computer-readable medium that stores a set of instructions for wireless communication by a base station. The set of instructions, when executed by one or more processors of the base station, may cause the base station to transmit, to a UE, information identifying a DRX configuration, that is different from an access link DRX configuration, associated with operation in a sidelink communication deployment. The set of instructions, when executed by one or more processors of the base station, may cause the base station to communicate, using a PDCCH, with the UE during UE use of the sidelink DRX configuration.

Some aspects described herein relate to an apparatus for wireless communication. The apparatus may include means for receiving information identifying a sidelink DRX configuration, that is different from an access link DRX configuration, associated with operation in a sidelink communication deployment. The apparatus may include means for monitoring a PDCCH discontinuously using the sidelink DRX configuration.

Some aspects described herein relate to an apparatus for wireless communication. The apparatus may include means for transmitting, to a UE, information identifying a sidelink DRX configuration, that is different from an access link DRX configuration, associated with operation in a sidelink communication deployment. The apparatus may include means for communicating, using a PDCCH, with the UE during UE use of the sidelink DRX configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
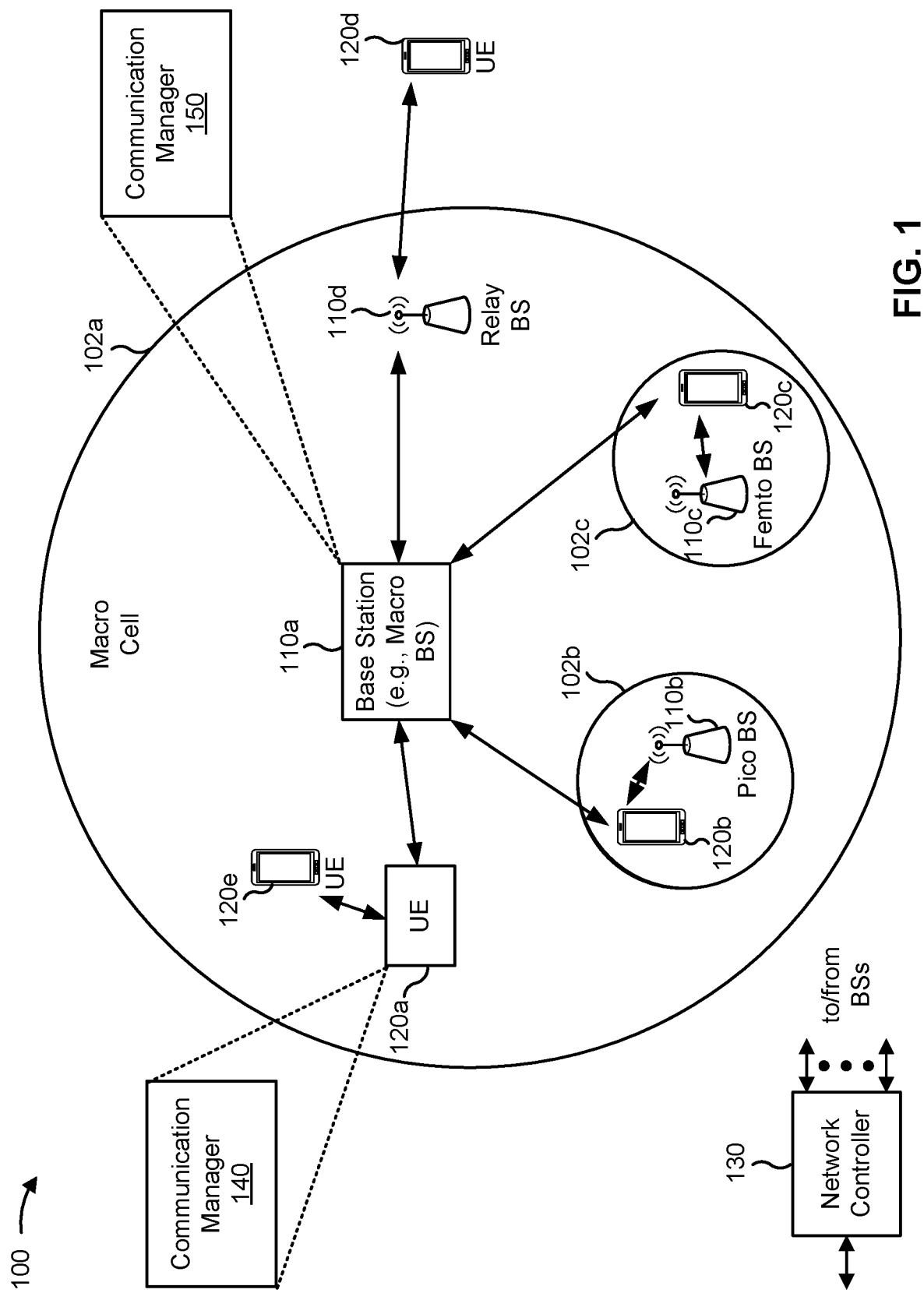
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive information identifying a sidelink discontinuous reception (DRX) configuration, that is different from an access link DRX configuration, associated with operation in a sidelink communication deployment; and monitor a physical downlink control channel (PDCCH) discontinuously using the sidelink DRX configuration. Additionally, or alternatively, the communication manager 140 may perform one or more other operations described herein.

In some aspects, the base station 110 may include a communication manager 150. As described in more detail elsewhere herein, the communication manager 150 may transmit, to a UE, information identifying a sidelink DRX configuration, that is different from an access link DRX configuration, associated with operation in a sidelink communication deployment; and communicate, using a PDCCH, with the UE during UE use of the sidelink DRX configuration. Additionally, or alternatively, the communication manager 150 may perform one or more other operations described herein.

As indicated above, FIG. 1 is provided as an example. Other examples may differ from what is described with regard to FIG. 1.

Figure 2:
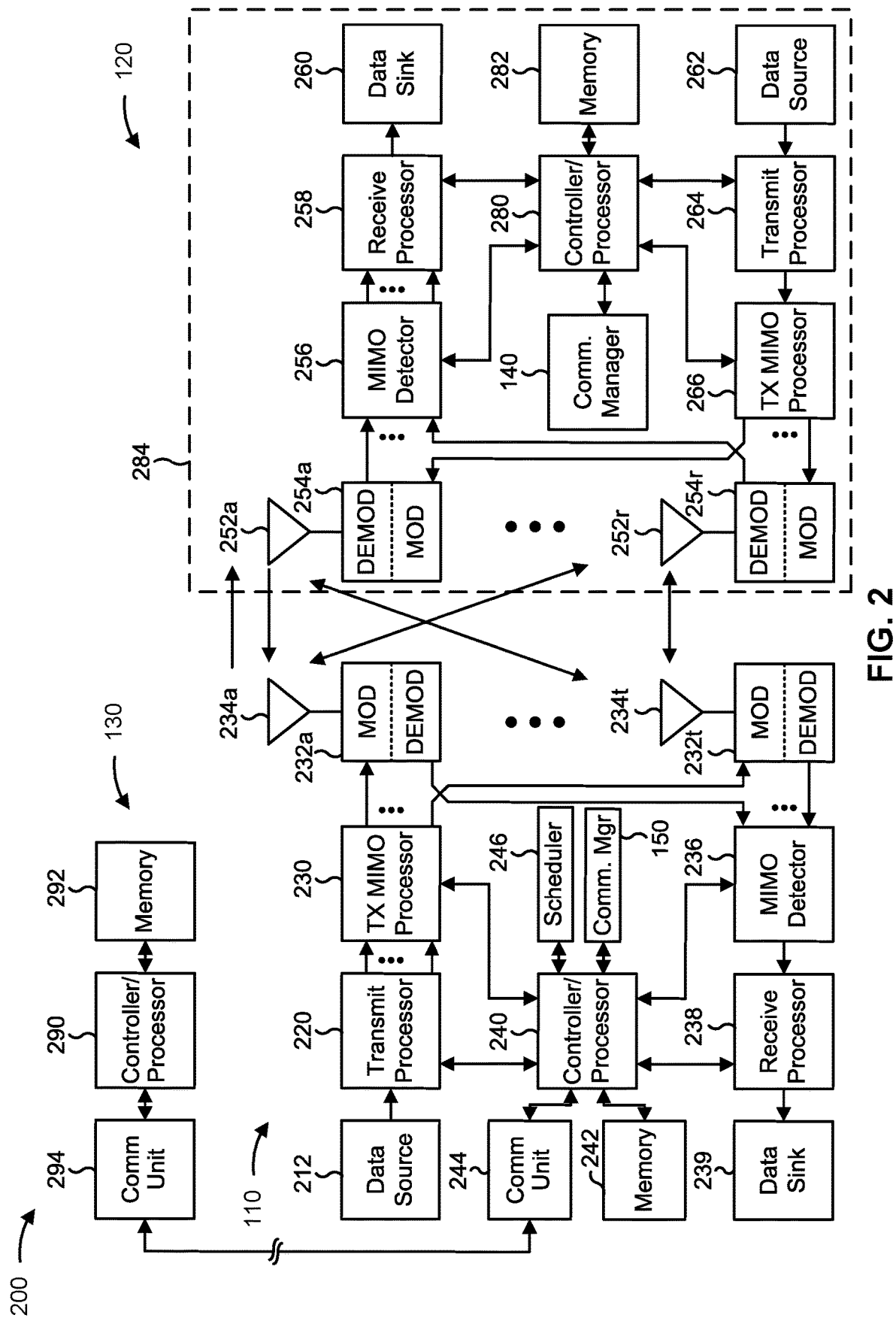
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-9).

The controller/processor 240 of the base station 110, the controller/processor 280 of the UE 120, and/or any other component(s) of FIG. 2 may perform one or more techniques associated with DRX mode configuration in sidelink communication deployments, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE includes means for receiving information identifying a sidelink DRX configuration, that is different from an access link DRX configuration, associated with operation in a sidelink communication deployment; and/or means for monitoring a PDCCH discontinuously using the sidelink DRX configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station includes means for transmitting, to a UE, information identifying a sidelink DRX configuration, that is different from an access link DRX configuration, associated with operation in a sidelink communication deployment; and/or means for communicating, using a PDCCH, with the UE during UE use of the sidelink DRX configuration. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
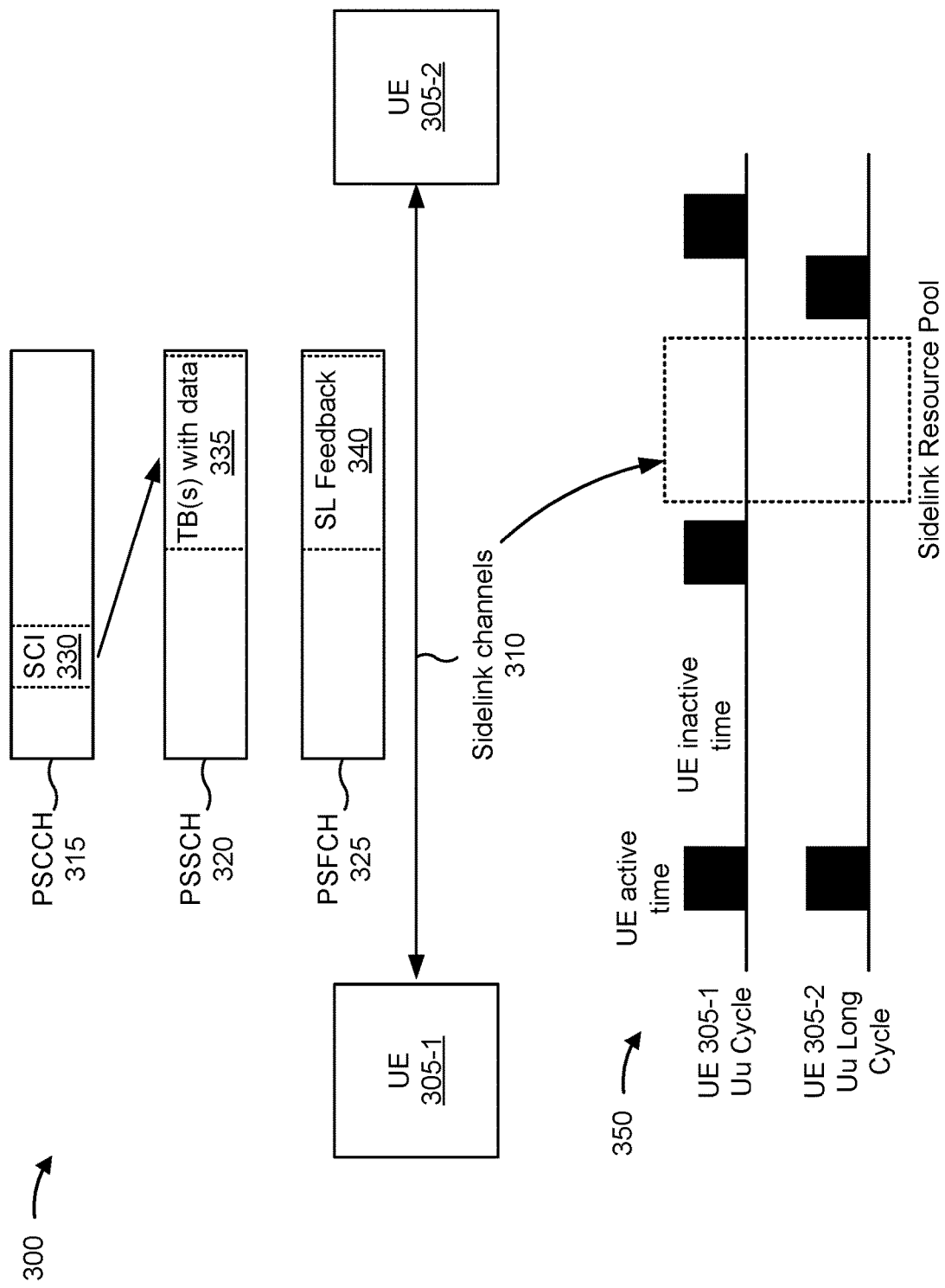
FIGS. 3 and 4 are diagrams illustrating examples of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a PDCCH and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

The one or more sidelink channels 310 may use resource pools. For example, a scheduling assignment (e.g., included in SCI 330) may be transmitted in sub-channels using specific resource blocks (RBs) across time. Data transmissions (e.g., on the PSSCH 320) associated with a scheduling assignment may occupy adjacent RBs in the same subframe as the scheduling assignment (e.g., using frequency division multiplexing). A scheduling assignment and associated data transmissions are not transmitted on adjacent RBs.

A sidelink resource pool may include a set of time and/or frequency resources allocated for sidelink activity. For example, a network controller, a BS, and/or the like may assign a set of resources in a network to a sidelink resource pool, and UEs in the network may perform sidelink activity during the sidelink resource pool. In this case, the BS, for example, may transmit a control signal to a UE (e.g., via a sidelink transmit grant, a sidelink receive grant, and/or the like) to identify particular resources to use in the sidelink resource pool. The UE may refrain from transmitting and/or receiving sidelink transmission using other resources outside of the sidelink resource pool. When the UE intends to transmit a sidelink transmission and has not received a grant, the UE may transmit a scheduling request to obtain a grant of resources within the sidelink resource pool.

In some cases, UEs 305 may operate in DRX. In DRX, a UE 305 may operate in an inactive or sleep mode (during an inactive time) and periodically transition to an active or awake mode (during an active time). For example, during the active time, a UE 305 may monitor for control signals (e.g., a PDCCH) from a BS, but during an inactive time, the UE 305 may forgo monitoring for control signals from the BS, thereby reducing power consumption.

As shown in timing diagram 350, when operating in DRX, UEs 305-1 and 305-2 may communicate on a sidelink (e.g., to transmit/receive a physical sidelink control channel (PSCCH), a PSSCH, a PSFCH, and/or the like) during a sidelink resource pool. However, in some cases, as a result of a timing of the sidelink resource pool, in which UEs 305 may reserve resources for communication with each other, relative to a timing of DRX, at least one of the UEs 305 may be in an inactive time and an inactive mode. For example, UE 305-1 may have a Uu (access link) cycle and UE 305-2 may have a Uu long cycle that causes the sidelink resource pool to fall outside of an active time. As a result, for example, UE 305-1 may miss an opportunity for communication on the sidelink. For example, as shown in FIG. 3, when the UE has a single Uu DRX cycle configured, a sleep state/inactive time of the DRX cycle may completely overlap with a sidelink resource pool providing sidelink resources. As a result, a BS may not be able to transmit control information to the UE to grant sidelink transmission resources or sidelink reception resources in the sidelink resource pool.

Furthermore, traffic patterns may be different on an access link relative to a sidelink. For example, an access link may have a relatively heavy traffic pattern, whereas on a sidelink there may be a relatively light traffic pattern. To optimize power consumption, a UE may have longer inactive times when a relatively light traffic pattern is occurring than when a relatively heavy traffic pattern is occurring. Thus, using the access link DRX may result in a UE having power utilization poorly optimized for, for example, a traffic pattern on the sidelink.

Some aspects described herein provide for sidelink (specific) DRX (mode) configuration. For example, as shown by timing diagram 350, in addition to an access link (specific) DRX (mode), the UE may have a sidelink DRX configured that has sleep periods that do not completely overlap with a sidelink resource time during which the UE can receive grants of sidelink transmission resources or sidelink reception resources. For example, a UE may receive information identifying a sidelink DRX configuration and may operate in a DRX in accordance with the sidelink DRX configuration during sidelink resource periods, such as during the sidelink resource pool. For example, the UE may monitor, discontinuously, depending on whether a time period is an inactive time or an active time, for a PDCCH using sidelink DRX operation in connection with the sidelink DRX configuration. In this way, the UE may avoid missing an opportunity to receive transmission or reception control information providing a grant of sidelink resources as a result of a mismatch between an access link DRX configuration and a presence of a sidelink resource pool. Moreover, the UE may optimize power consumption to a traffic pattern on a sidelink.

As indicated above, FIG. 3 is provided as an example. Other examples may differ from what is described with respect to FIG. 3.

Figure 4:
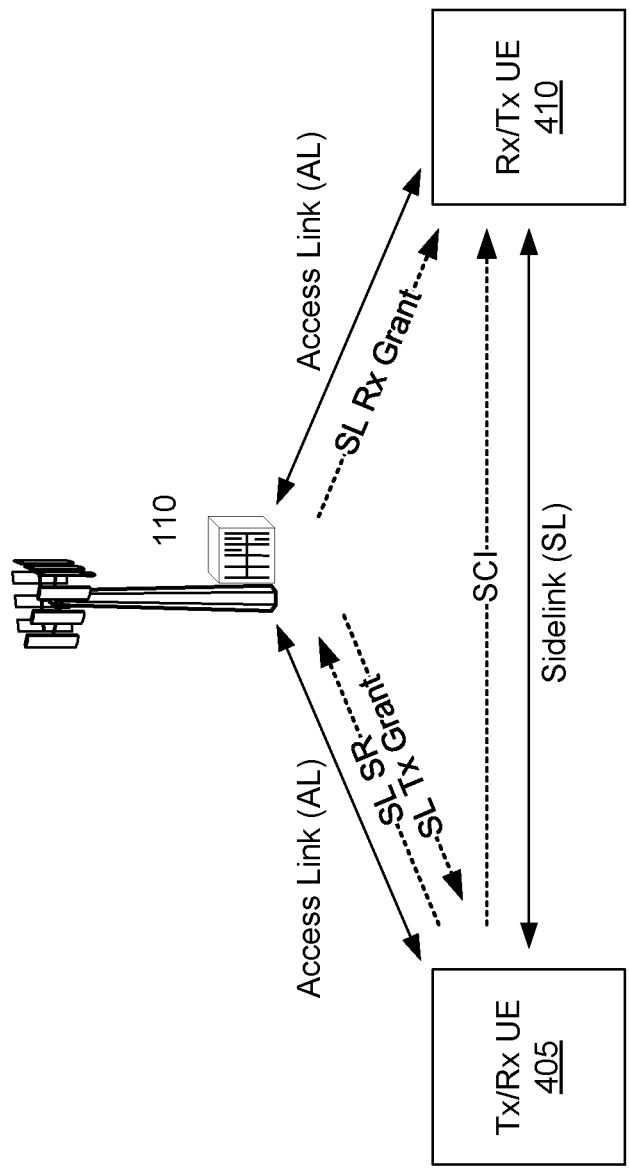

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. For example, Tx/Rx UE 405 may transmit a sidelink SR, on the first access link, to BS 110, and may receive a sidelink transmission grant, on the first access link, from BS 110. In this way, BS 110 enables Tx/Rx UE 405 to transmit SCI to Rx/Tx UE 410 on a sidelink. Additionally, or alternatively, in some sidelink modes, the base station 110 may communicate with the Rx/Tx UE 410 via a second access link. For example, as a response to receiving the sidelink scheduling request, BS 110 may transmit a sidelink receive grant on the second access link to Rx/Tx UE 410, thereby enabling the Rx/Tx UE 410 to receive the SCI from Tx/Rx UE 405 on the sidelink. The Tx/Rx UE 405 and/or the Rx/Tx UE 410 may correspond to one or more UEs described elsewhere herein, such as the UE 120 of FIG. 1. A direct link between UEs 120 (e.g., via a PC5 interface) may be referred to as the sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5A:
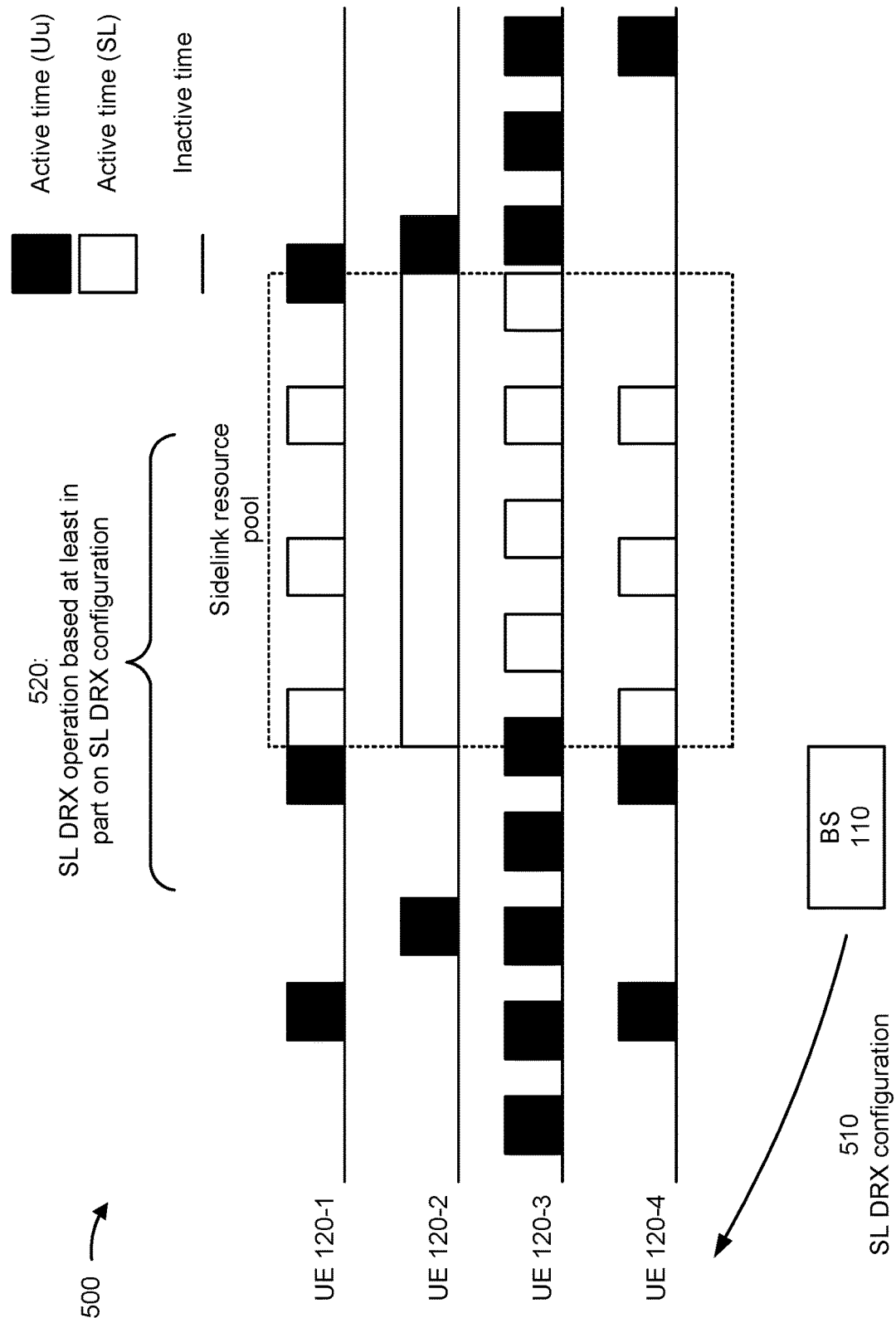
FIGS. 5A and 5B are diagrams illustrating examples associated with discontinuous reception (DRX) mode configuration in sidelink communication deployments, in accordance with the present disclosure.
Figure 5B:
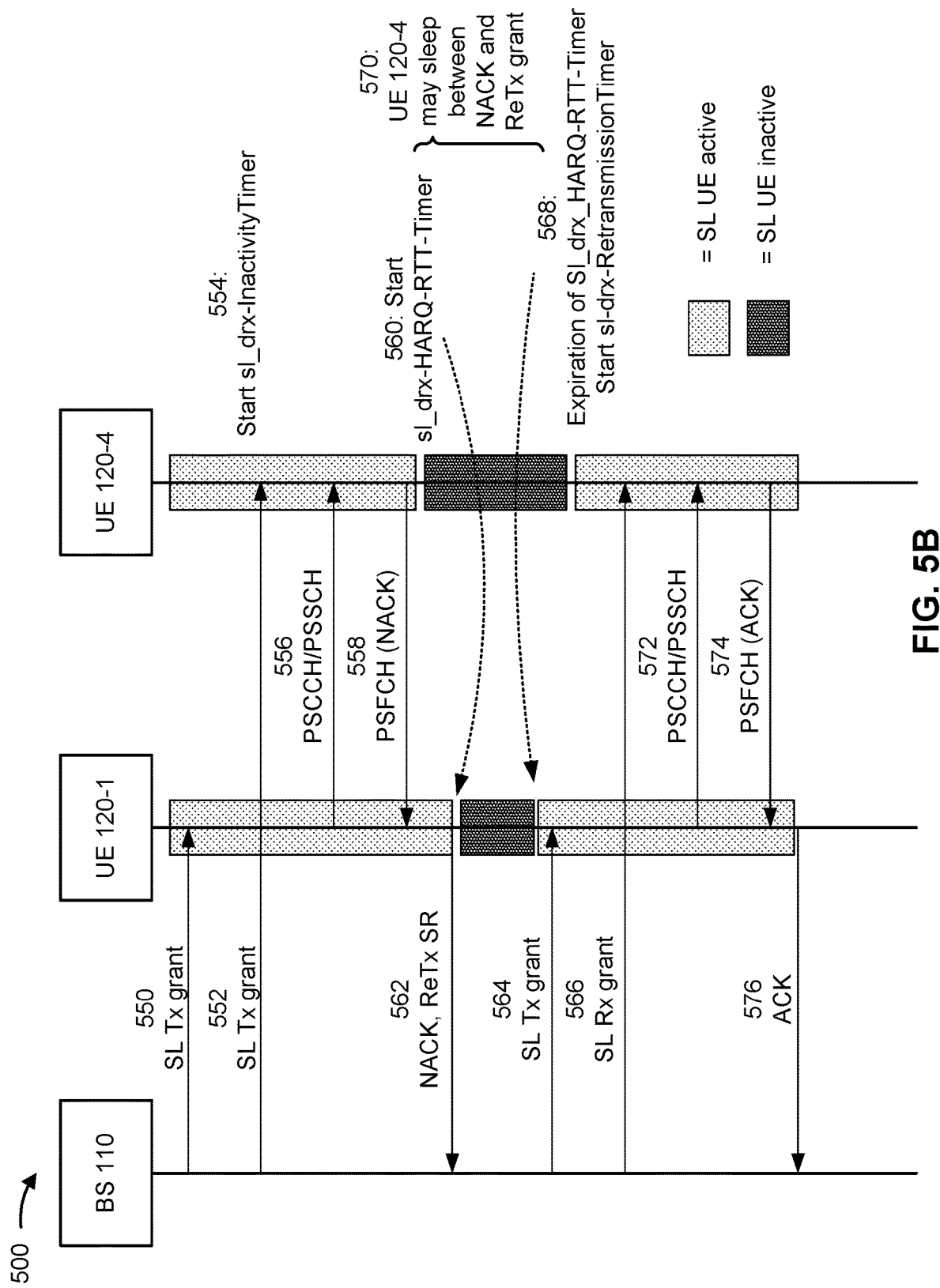

FIGS. 5A and 5B are diagrams illustrating an example 500 of DRX configuration in sidelink communication deployments, in accordance with the present disclosure. As shown in FIG. 5A, a UE (e.g., one or more of UEs 120-1 through 120-4) may communicate (e.g., transmit an uplink transmission and/or receive a downlink transmission) with a BS (e.g., BS 110). In some aspects, the UE may communicate with another UE via one or more sidelink communications (e.g., in addition to, or in place of, communicating with the BS). The UEs and the BS may be part of a wireless network (e.g., wireless network 100).

As shown by reference number 510, BS 110 may transmit information identifying a sidelink (specific) DRX configuration to one or more UEs 120. For example, BS 110 may provide information identifying a periodicity for active times during a sidelink resource pool to enable a UE 120 to communicate using resources of the sidelink resource pool. In some aspects, a UE 120 may receive the information identifying the sidelink DRX configuration via a radio resource control (RRC) message. For example, BS 110 may transmit an RRC message including information configuring the sidelink DRX configuration. In this case, BS 110 may transmit subsequent signaling via a medium access control (MAC) control element (CE) to activate or deactivate use of the sidelink DRX configuration.

In some aspects, the sidelink DRX configuration may include information configuring one or more timers. For example, as described in more detail with regard to FIG. 5B, BS 110 may configure a sidelink DRX inactivity timer, a sidelink DRX HARQ retransmission time (RTT) timer (SL-specific drx-HARQ-RTT-Timer), a sidelink DRX retransmission timer (SL-specific drx-RetransmissionTimer), an on duration timer, and/or the like. Additionally, or alternatively, the sidelink DRX configuration may include one or more parameters identifying a cycle for active times, waking up for an active time, and/or the like. For example, the sidelink DRX configuration may include information identifying a sidelink DRX long cycle, a sidelink DRX start offset, a sidelink DRX short cycle, and/or the like. In this way, BS 110 may provide the sidelink DRX configuration to define when a DRX cycle is to start, how long a sidelink DRX cycle is to last, and/or the like. In some aspects, a UE 120 may be configured with a plurality of sidelink DRX cycles, such as a sidelink DRX short cycle, a sidelink DRX long cycle, and/or the like. Additionally, or alternatively, UE 120 may be configured with only a sidelink DRX cycle.

In some aspects, BS 110 may configure different SL DRX configurations for different UEs 120. For example, UE 120-1 and UE 120-4 may have a first sidelink DRX configuration with a first periodicity for active times during a sidelink resource pool. In contrast, UE 120-3 may have a second periodicity for active times during a sidelink resource pool. In some aspects, a UE 120 may have a default configuration for an SL DRX configuration. For example, UE 120-2 may have a default configuration where UE 120-2 is in an active time for, for example, an entirety of a sidelink resource pool. In this case, the SL DRX configuration may be by implementation such that when UE 120-2 receives a sidelink DRX command from BS 110, UE 120-2 is configured to remain awake in an active time for the entirety of the sidelink resource pool.

As further shown in FIG. 5A, and by reference number 520, UEs 120 may operate in sidelink DRX in accordance with respective sidelink DRX configurations. For example, a UE 120 may transition to an awake state during active times based at least in part on a periodicity of the active time. In some aspects, a UE 120 may monitor for a communication during an active time in accordance with sidelink DRX. For example, a UE 120 may monitor for a PDCCH from BS 110 during an active time in accordance with sidelink DRX. In this case, UE 120 may receive a PDCCH that includes downlink control information (DCI) associated with or triggering sidelink communication, such as DCI type 3_0. In some aspects, during sidelink DRX operation, a UE 120 may receive a wake up signal from a BS 110. For example, UE 120 may receive DCI type 2_6 indicating that UE 120 is to wake up in an upcoming active time or forgo waking up in an upcoming active time.

As shown in FIG. 5B, and by reference numbers 550 and 552, during a first active time of a sidelink resource pool, UE 120-1 and UE 120-4 may monitor for and receive a sidelink transmission grant and a sidelink receive grant, respectively. Monitoring for a transmission may include tuning to and/or receiving/attempting to receive signals in a particular resource frequency and time. Using received signals associated with the particular resource frequency and time, a UE 120 (UE 120-1 and UE 120-4) may attempt to decode the received signals to determine a transmission conveying information is received. Based at least in part on receiving the sidelink receive grant, UE 120-4 may start a sidelink DRX inactivity timer, as shown by reference number 554.

As further shown in FIG. 5B, and by reference numbers 556 and 558, UE 120-1 may transmit a PSCCH or PSSCH to UE 120-4 and UE 120-4 may transmit a PSFCH to UE 120-1. For example, UE 120-1 may attempt to transmit the PSCCH to UE 120-4 using the respective sidelink transmission and sidelink reception grants, but UE 120-4 may transmit a negative acknowledgement (NACK) as HARQ feedback indicating that the attempted transmission was unsuccessful. In connection with transmitting the NACK, UE 120-4 may start a sidelink DRX HARQ RTT timer (SL-specific drx-HARQ-RTT-Timer), as shown by reference number 560.

As further shown in FIG. 5B, and by reference numbers 562-566, based at least in part on receiving the NACK, UE 120-1 may transmit a retransmission scheduling request to BS 110 to obtain another transmission grant for retransmitting the PSCCH or PSSCH. Additionally, or alternatively, in connection with transmitting a retransmission scheduling request to BS 110, UE 120-1 may start a sidelink DRX HARQ RTT timer (SL-specific drx-HARQ-RTT-Timer), as shown by reference number 560. BS 110 may, after an inactive time and during a second active time of the sidelink resource pool, transmit information identifying a sidelink transmission grant to UE 120-1 and a sidelink reception grant to UE 120-4. As shown by reference numbers 568 and 570, UE 120-4 may be in an inactive time and may transition to a sleep state between transmitting the NACK and receiving the reception grant for the retransmission. Additionally, or alternatively, UE 120-4 may start a sidelink DRX retransmission timer (SL-specific drx-Retransmission Timer) based at least in part on an expiration of the sidelink DRX HARQ RTT timer. Additionally, or alternatively, UE 120-1 may start a sidelink DRX retransmission timer (SL-specific drx-RetransmissionTimer) based at least in part on an expiration of the sidelink DRX HARQ RTT timer. For example, the sidelink DRX HARQ RTT timer may define a minimum duration between transmission of the HARQ feedback (e.g., the PSFCH) and an expected (by a MAC entity of UE 120-4 or by a MAC entity of UE 120-1) reception of another reception grant for a retransmission triggered by the HARQ feedback. Similarly, the sidelink DRX retransmission timer defines a maximum duration until a grant for a sidelink retransmission is expected to be received, after which UE 120-4 or UE 120-1 can return to a sleep state if a retransmission grant is not received. In this way, the sidelink DRX HARQ RTT timer and/or the sidelink DRX retransmission timer enable UE 120-4 and UE 120-1 to enter the sleep state and reduce power consumption.

As further shown in FIG. 5B, and by reference numbers 572-576, during the second active time, UE 120-1 may retransmit the PSCCH or PSSCH to UE 120-4 and may receive a PSFCH with a feedback message (e.g., a HARQ ACK). In this case, UE 120-1 may provide the ACK to BS 110 indicating that the retransmission was successful and that further retransmission resources are not needed.

As indicated above, FIGS. 5A and 5B are provided as an example. Other examples may differ from what is described with regard to FIGS. 5A and 5B.

Figure 6:
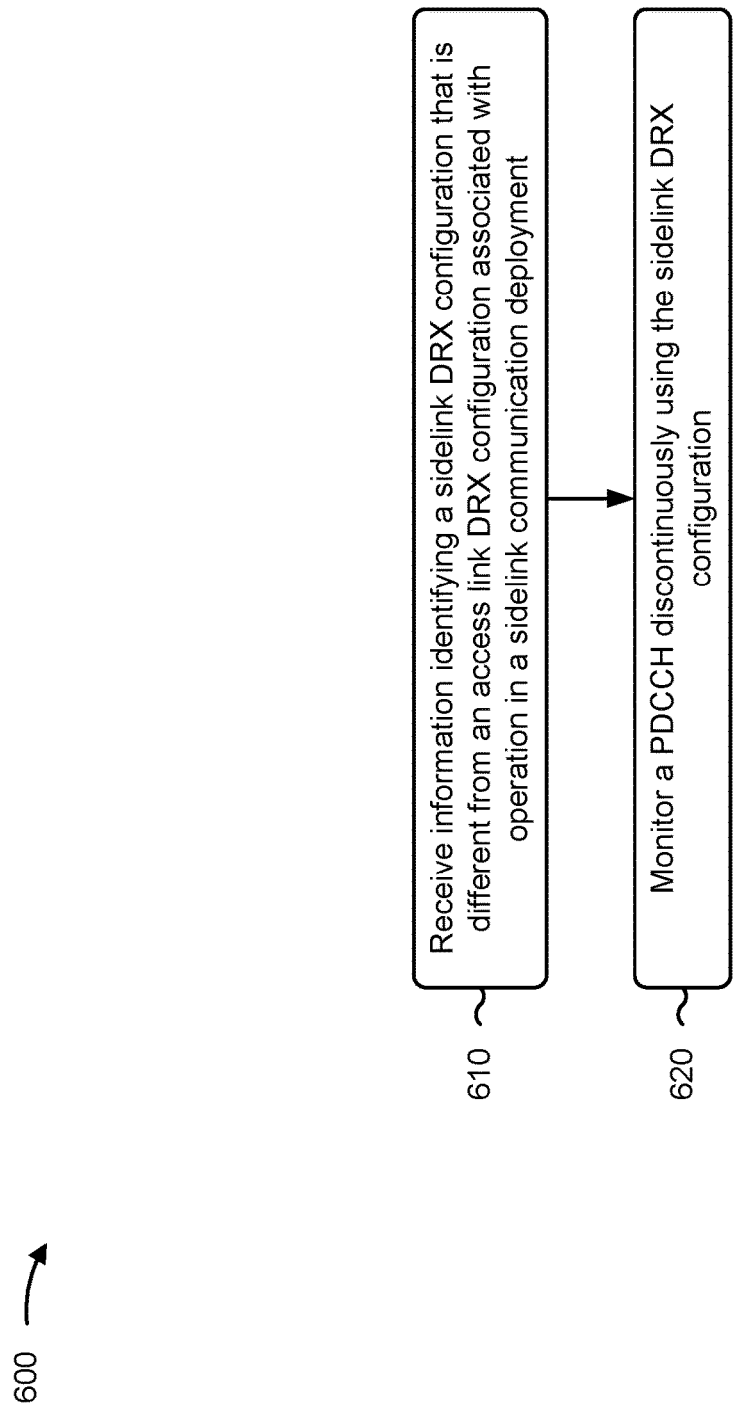
FIGS. 6-7 are diagrams illustrating example processes associated with DRX configuration in sidelink communication deployments, in accordance with the present disclosure.

FIG. 6 is a diagram illustrating an example process 600 performed, for example, by a UE, in accordance with the present disclosure. Example process 600 is an example where the UE (e.g., UE 120) performs operations associated with DRX configuration in sidelink communication deployments.

As shown in FIG. 6, in some aspects, process 600 may include receiving information identifying a sidelink DRX configuration that is different from an access link DRX configuration associated with operation in a sidelink communication deployment (block 610). For example, the UE (e.g., using communication manager 140 and/or reception component 802, depicted in FIG. 8) may receive information identifying a sidelink DR) configuration that is different from an access link DRX configuration associated with operation in a sidelink communication deployment, as described above.

As further shown in FIG. 6, in some aspects, process 600 may include monitoring a PDCCH discontinuously using the sidelink DRX configuration (block 620). For example, the UE (e.g., using communication manager 140 and/or monitoring component 808, depicted in FIG. 8) may monitor a PDCCH discontinuously using the sidelink DRX configuration, as described above.

Process 600 may include additional aspects, such as any single aspect or any combination of aspects described below and/or in connection with one or more other processes described elsewhere herein.

In a first aspect, process 600 includes switching between the access link DRX configuration and the sidelink DRX configuration based at least in part on whether sidelink communication is occurring.

In a second aspect, alone or in combination with the first aspect, the PDCCH is a PDCCH associated with sidelink communication or a PDCCH scheduling sidelink communication.

In a third aspect, alone or in combination with one or more of the first and second aspects, sidelink communication is during a time period allocated for sidelink activity.

In a fourth aspect, alone or in combination with one or more of the first through third aspects, a timer configuration associated with the sidelink DRX configuration is based at least in part on the operation in the sidelink communication deployment, and wherein the timer configuration is for at least one of an on duration timer, an inactivity timer, a feedback timer, or a retransmission timer.

In a fifth aspect, alone or in combination with one or more of the first through fourth aspects, the feedback timer is a DRX hybrid automatic repeat request round-trip time timer.

In a sixth aspect, alone or in combination with one or more of the first through fifth aspects, the retransmission timer is a DRX retransmission timer.

In a seventh aspect, alone or in combination with one or more of the first through sixth aspects, the sidelink DRX configuration includes a configuration of at least one of a sidelink DRX long cycle, a sidelink DRX start offset, or a sidelink DRX short cycle.

In an eighth aspect, alone or in combination with one or more of the first through seventh aspects, receiving the information identifying the sidelink DRX configuration comprises receiving a radio resource control message, from a base station, conveying the information identifying the operation in the sidelink communication deployment.

In a ninth aspect, alone or in combination with one or more of the first through eighth aspects, process 600 includes receiving a sidelink DRX command medium access control control element, from a base station, activating the sidelink DRX configuration.

In a tenth aspect, alone or in combination with one or more of the first through ninth aspects, the sidelink DRX configuration specifies that the UE is to be active during an entirety of a sidelink resource pool.

In an eleventh aspect, alone or in combination with one or more of the first through tenth aspects, process 600 includes receiving a downlink control information conveying a wake up signal and remaining in an inactive time based at least in part on receiving the downlink control information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
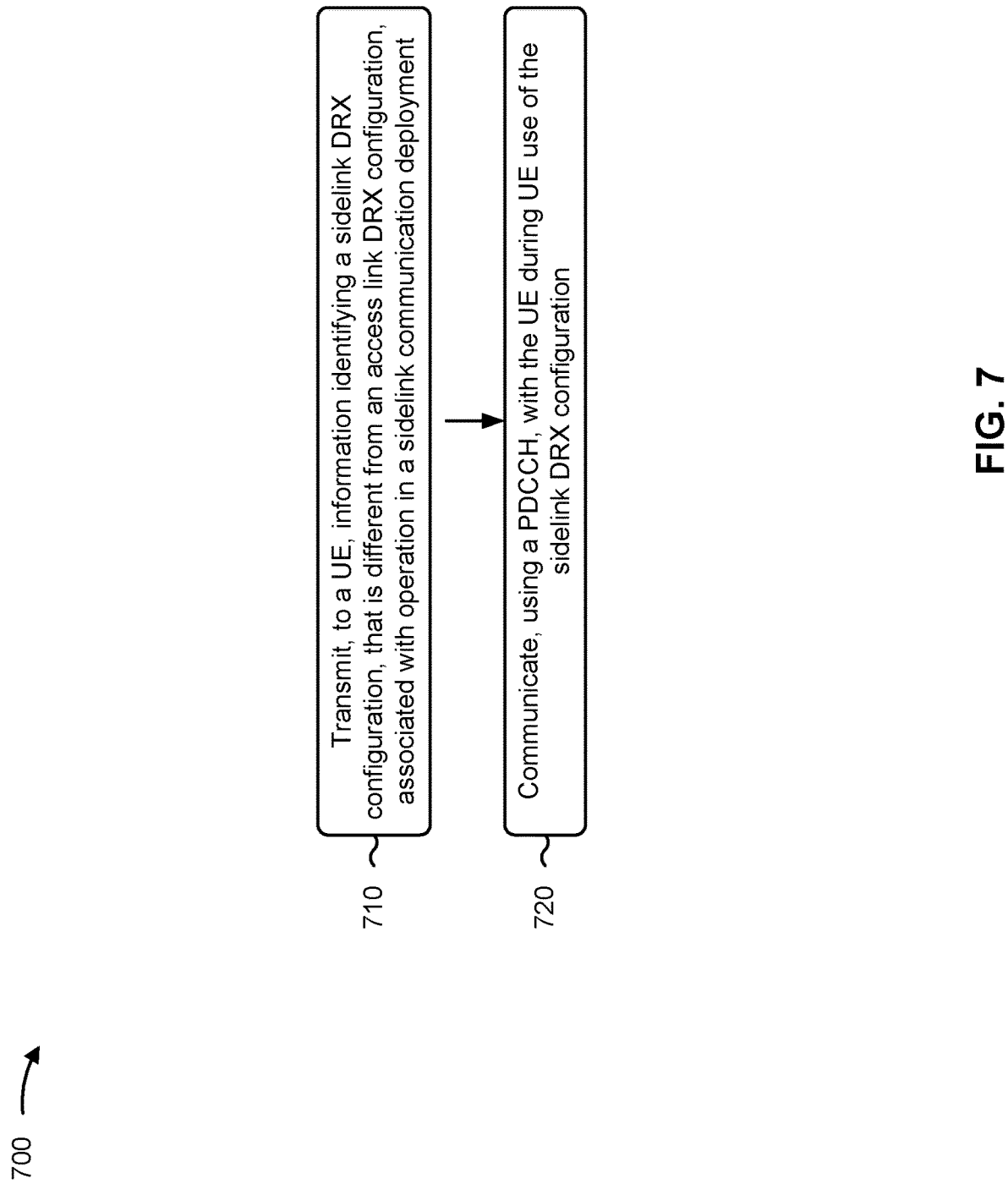

FIG. 7 is a diagram illustrating an example process 700 performed, for example, by a base station, in accordance with the present disclosure. Example process 700 is an example where the base station (e.g., base station 110) performs operations associated with DRX configuration in sidelink communication deployments.

As shown in FIG. 7, in some aspects, process 700 may include transmitting, to a UE, information identifying a sidelink DRX configuration that is different from an access link DRX configuration associated with operation in a sidelink communication deployment (block 710). For example, the base station (e.g., using communication manager 150 and/or transmission component 904, depicted in FIG. 9) may transmit, to a UE, information identifying a sidelink DRX configuration that is different from an access link DRX configuration associated with operation in a sidelink communication deployment, as described above.

As further shown in FIG. 7, in some aspects, process 700 may include communicating, using a PDCCH, with the UE during UE use of the sidelink DRX configuration (block 720). For example, the base station (e.g., using communication manager 150 and/or reception component 902 or transmission component 904, depicted in FIG. 9) may communicate, using a PDCCH, with the UE during UE use of the sidelink DRX configuration, as described above.

Process 700 may include additional aspects, such as any single aspect or any combination of aspects described below and/or in connection with one or more other processes described elsewhere herein.

In a first aspect, the PDCCH is a PDCCH associated with sidelink communication or a PDCCH scheduling sidelink communication.

In a second aspect, alone or in combination with the first aspect, the sidelink DRX operation is during a time period allocated for sidelink activity.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
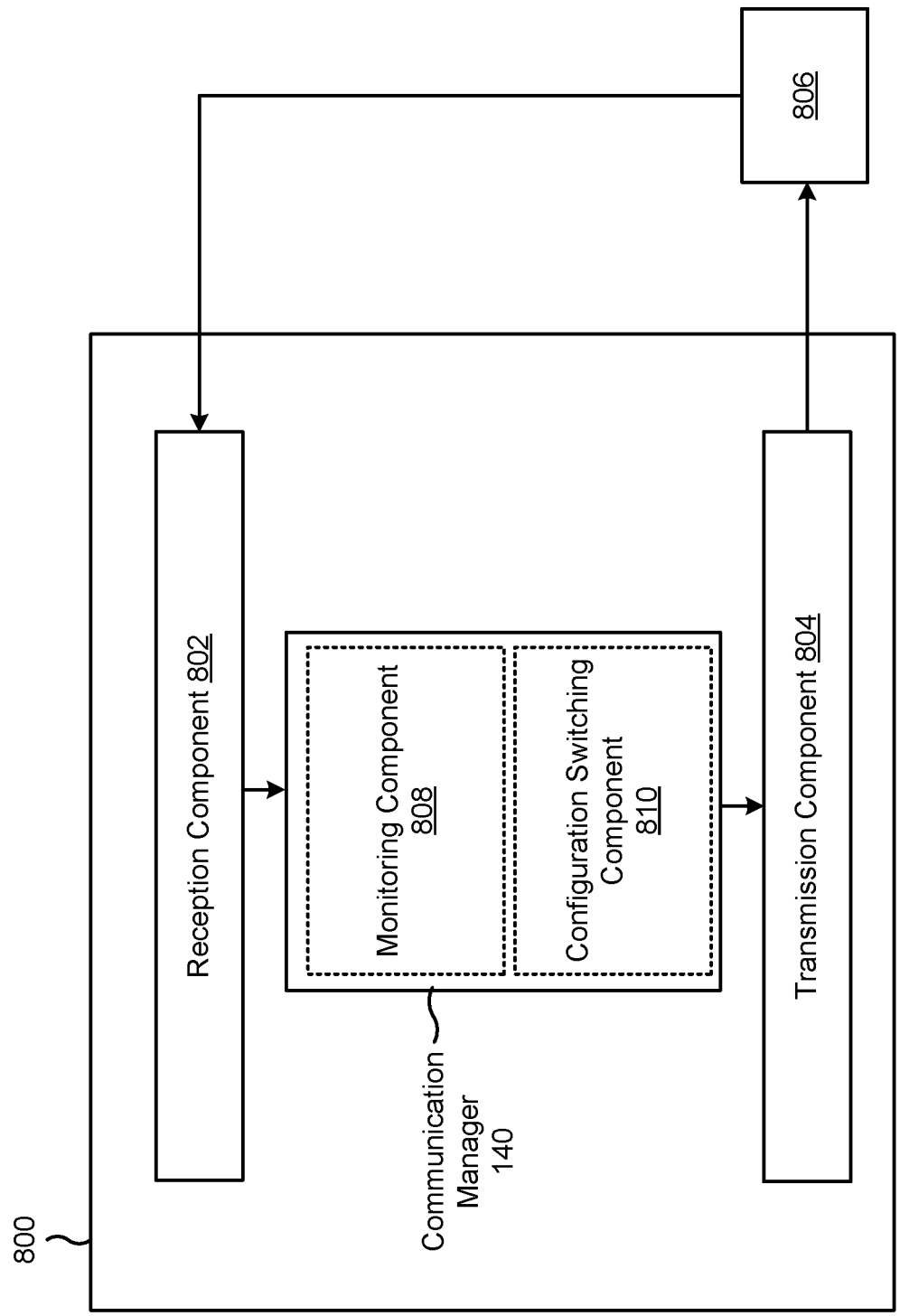
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a monitoring component 808 or a configuration switching component 810, among other examples.

In some aspects, the apparatus 800 may be configured to perform one or more operations described herein in connection with FIGS. 5A-5B. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive information identifying a sidelink DRX configuration, that is different from an access link DRX configuration, associated with operation in a sidelink communication deployment. The monitoring component 808 may monitor a PDCCH discontinuously using the sidelink DRX configuration.

The configuration switching component 810 may switch between the access link DRX configuration and the sidelink DRX configuration based at least in part on whether sidelink communication is occurring. The reception component 802 may receive a sidelink DRX command medium access control control element, from a base station, activating the sidelink DRX configuration. The reception component 802 may receive a downlink control information conveying a wake up signal. The configuration switching component 810 may remain in an inactive time based at least in part on receiving the downlink control information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
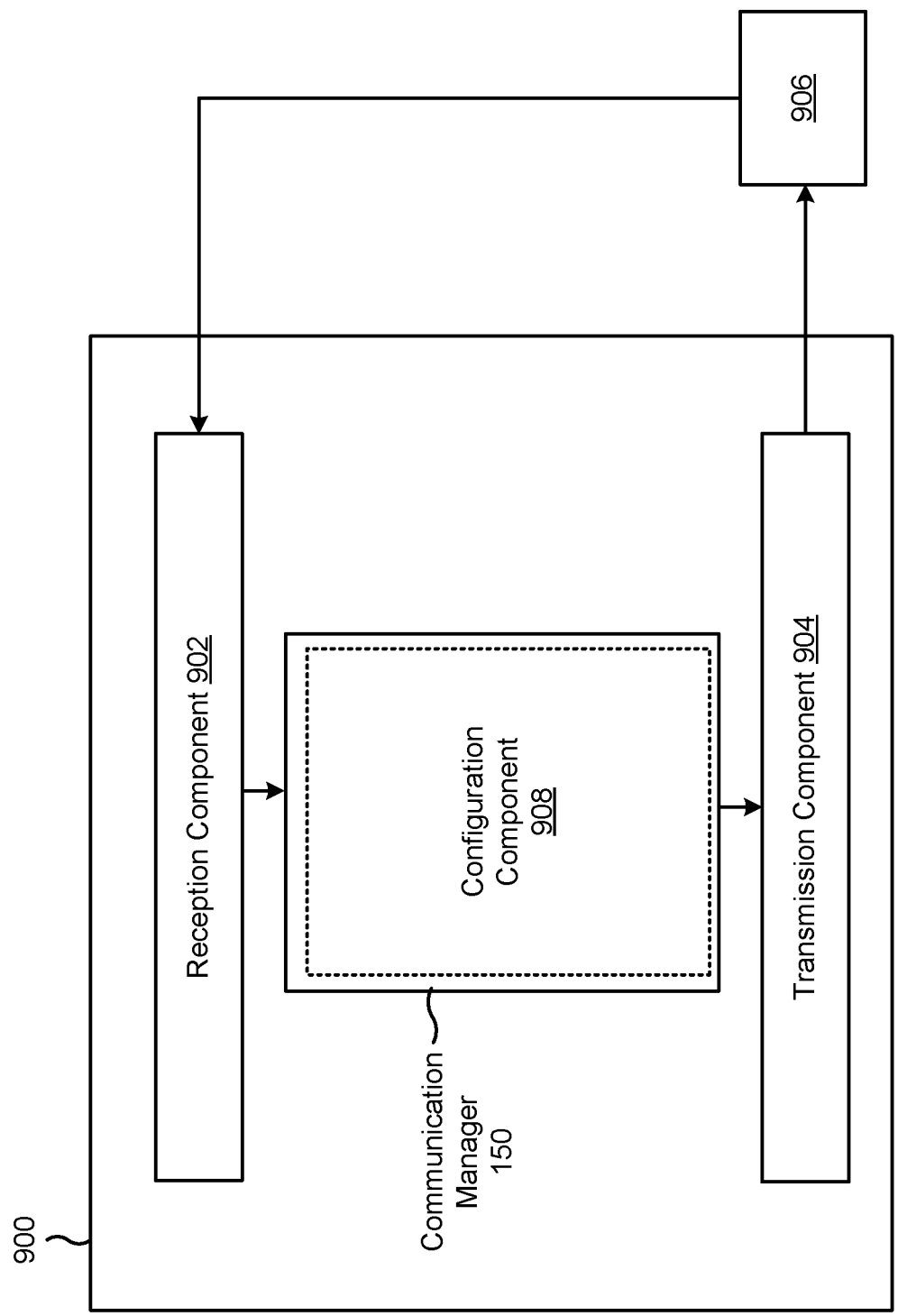

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may a configuration component 908, among other examples.

In some aspects, the apparatus 900 may be configured to perform one or more operations described herein in connection with FIGS. 5A-5B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, information identifying a sidelink DRX configuration, that is different from an access link DRX configuration, associated with operation in a sidelink communication deployment. The reception component 902 or the transmission component 904 may communicate, using a PDCCH, with the UE during UE use of the sidelink DRX configuration. The configuration component 908 may configure one or more DRX configurations, such as a sidelink DRX configuration or an access link DRX configuration for the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving information identifying a sidelink discontinuous reception (DRX) configuration, that is different from an access link DRX configuration, associated with operation in a sidelink communication deployment; and monitoring a physical downlink control channel (PDCCH) discontinuously using the sidelink DRX configuration.

Aspect 2: The method of Aspect 1, further comprising: switching between the access link DRX configuration and the sidelink DRX configuration based at least in part on whether sidelink communication is occurring.

Aspect 3: The method of any of Aspects 1 to 2, wherein the PDCCH is a PDCCH associated with sidelink communication or a PDCCH scheduling sidelink communication.

Aspect 4: The method of any of Aspects 1 to 3, wherein sidelink communication is during a time period allocated for sidelink activity.

Aspect 5: The method of any of Aspects 1 to 4, wherein a timer configuration associated with the sidelink DRX configuration is based at least in part on the operation in the sidelink communication deployment, and wherein the timer configuration is for at least one of: an on duration timer, an inactivity timer, a feedback timer, or a retransmission timer.

Aspect 6: The method of Aspect 5, wherein the feedback timer is a DRX hybrid automatic repeat request round-trip time timer.

Aspect 7: The method of any of Aspects 5 to 6, wherein the retransmission timer is a DRX retransmission timer.

Aspect 8: The method of any of Aspects 1 to 7, wherein the sidelink DRX configuration includes a configuration of at least one of: a sidelink DRX long cycle, a sidelink DRX start offset, or a sidelink DRX short cycle.

Aspect 9: The method of any of Aspects 1 to 8, wherein receiving the information identifying the sidelink DRX configuration comprises: receiving a radio resource control message, from a base station, conveying the information identifying the operation in the sidelink communication deployment.

Aspect 10: The method of any of Aspects 1 to 9, further comprising: receiving a sidelink DRX command medium access control control element, from a base station, activating the sidelink DRX configuration.

Aspect 11: The method of any of Aspects 1 to 10, wherein the sidelink DRX configuration specifies that the UE is to be active during an entirety of a sidelink resource pool.

Aspect 12: The method of any of Aspects 1 to 11, further comprising: receiving a downlink control information conveying a wake up signal; and remaining in an inactive time based at least in part on receiving the downlink control information.

Aspect 13: A method of wireless communication performed by a base station, comprising: transmitting, to a user equipment (UE), information identifying a sidelink discontinuous reception (DRX) configuration, that is different from an access link DRX configuration, associated with operation in a sidelink communication deployment; and communicating, using a physical downlink control channel (PDCCH), with the UE during UE use of the sidelink DRX configuration.

Aspect 14: The method of Aspect 13, wherein the PDCCH is a PDCCH associated with sidelink communication or a PDCCH scheduling sidelink communication.

Aspect 15: The method of any of Aspects 13 to 14, wherein the sidelink DRX operation is during a time period allocated for sidelink activity.

Aspect 16: An apparatus for wireless communication at a device, comprising a processor; memory coupled with the processor; and instructions stored in the memory and executable by the processor to cause the apparatus to perform the method of one or more of Aspects 1-12.

Aspect 17: A device for wireless communication, comprising a memory and one or more processors coupled to the memory, the one or more processors configured to perform the method of one or more of Aspects 1-12.

Aspect 18: An apparatus for wireless communication, comprising at least one means for performing the method of one or more of Aspects 1-12.

Aspect 19: A non-transitory computer-readable medium storing code for wireless communication, the code comprising instructions executable by a processor to perform the method of one or more of Aspects 1-12.

Aspect 20: A non-transitory computer-readable medium storing a set of instructions for wireless communication, the set of instructions comprising one or more instructions that, when executed by one or more processors of a device, cause the device to perform the method of one or more of Aspects 1-12.

Aspect 21: An apparatus for wireless communication at a device, comprising a processor; memory coupled with the processor; and instructions stored in the memory and executable by the processor to cause the apparatus to perform the method of one or more of Aspects 13-15.

Aspect 22: A device for wireless communication, comprising a memory and one or more processors coupled to the memory, the one or more processors configured to perform the method of one or more of Aspects 13-15.

Aspect 23: An apparatus for wireless communication, comprising at least one means for performing the method of one or more of Aspects 13-15.

Aspect 24: A non-transitory computer-readable medium storing code for wireless communication, the code comprising instructions executable by a processor to perform the method of one or more of Aspects 13-15.

Aspect 25: A non-transitory computer-readable medium storing a set of instructions for wireless communication, the set of instructions comprising one or more instructions that, when executed by one or more processors of a device, cause the device to perform the method of one or more of Aspects 13-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to cause the UE to:
   receive information identifying a sidelink discontinuous reception (DRX) configuration that is different from an access link DRX configuration,
      wherein the access link DRX configuration defines an access link DRX cycle with one or more of a sleep state or an inactive time that completely overlaps with a sidelink resource pool providing sidelink resources, and
      wherein the sidelink DRX configuration defines one or more sidelink DRX cycles with one or more sleep periods that do not completely overlap with the sidelink resource pool;
   receive, during a sidelink DRX operation that is based on the sidelink DRX configuration, a downlink control information (DCI) type 2_6 indicating that the UE is to wake up in an upcoming active time or forgo waking up in the upcoming active time;
   transmit a negative acknowledgement (NACK) to a different UE, wherein the NACK indicates that an attempt by the different UE to transmit a physical sidelink control channel (PSCCH) was unsuccessful; and
   start a sidelink DRX hybrid automatic repeat request (HARD) round-trip time timer (RTT) timer based on the sidelink DRX configuration and based on transmitting the NACK to the different UE.

2. The UE of claim 1, wherein the one or more processors are further configured to cause the UE to:
   switch between the access link DRX configuration and the sidelink DRX configuration based at least in part on whether sidelink communication is occurring.

3. The UE of claim 1, wherein the one or more processors are further configured to cause the UE to:
   monitor a physical downlink control channel (PDCCH) discontinuously, and
   wherein the PDCCH is a PDCCH associated with sidelink communication or a PDCCH scheduling sidelink communication.

4. The UE of claim 1, wherein sidelink communication is during a time period, of the sidelink resources, allocated for sidelink activity during the sidelink resource pool.

5. The UE of claim 1, wherein the one or more sidelink DRX cycles include a sidelink DRX long cycle.

6. The UE of claim 1, wherein the one or more processors, to receive the information identifying the sidelink DRX configuration, are configured to cause the UE to:
   receive a radio resource control message, from a base station, conveying the information identifying the sidelink DRX configuration.

7. The UE of claim 1, wherein the one or more processors are further configured to cause the UE to:
   receive a sidelink DRX command medium access control control element, from a base station, activating the sidelink DRX configuration.

8. The UE of claim 1, wherein the sidelink DRX configuration specifies that the UE is to be active during an entirety of the sidelink resource pool.

9. The UE of claim 1, wherein the one or more processors are further configured to cause the UE to:
   remain in an inactive time based at least in part on receiving the DCI type 2_6.

10. The UE of claim 1, wherein the DCI type 2_6 indicates that the UE is to forgo waking up in the upcoming active time.

11. A base station for wireless communication, comprising:
   one or more memories; and one or more processors, coupled to the one or more memories, configured to cause the base station to:
  transmit, to a user equipment (UE), information identifying a sidelink discontinuous reception (DRX) configuration that is different from an access link DRX configuration and that is associated with an operation in a sidelink communication deployment,
    wherein the access link DRX configuration defines an access link DRX cycle with one or more of a sleep state or an inactive time that completely overlaps with a sidelink resource pool providing sidelink resources, and
    wherein the sidelink DRX configuration defines one or more sidelink DRX cycles with one or more sleep periods that do not completely overlap with the sidelink resource pool;
  transmit, to the UE, a downlink control information (DCI) type 2_6 indicating that the UE is to wake up in an upcoming active time or forgo waking up in the upcoming active time; and
  receive, from the UE, a retransmission scheduling request after the UE receives a negative acknowledgement (NACK) from a different UE that starts a sidelink DRX hybrid automatic repeat request (HARD) round-trip time timer (RTT) timer, wherein the NACK indicates that an attempt to transmit a physical sidelink control channel (PSCCH) was unsuccessful.

12. The base station of claim 11,
  wherein the one or more processors are further configured to cause the base station to:
    communicate, using a physical downlink control channel (PDCCH) discontinuously, with the UE, and
  wherein the PDCCH is a PDCCH associated with sidelink communication or a PDCCH scheduling sidelink communication.

13. The base station of claim 11, wherein the operation is during a time period, of the sidelink resources, allocated for sidelink activity during the sidelink resource pool.

14. The base station of claim 11, wherein the DCI type 2_6 indicates that the UE is to forgo waking up in the upcoming active time.

15. A method of wireless communication performed by a user equipment (UE), comprising:
  receiving information identifying a sidelink discontinuous reception (DRX) configuration that is different from an access link DRX configuration,
    wherein the access link DRX configuration defines an access link DRX cycle with one or more of a sleep state or an inactive time that completely overlaps with a sidelink resource pool providing sidelink resources, and
    wherein the sidelink DRX configuration defines one or more sidelink DRX cycles with one or more sleep periods that do not completely overlap with the sidelink resource pool;
  receiving, during a sidelink DRX operation that is based on the sidelink DRX configuration, a downlink control information (DCI) type 2_6 indicating that the UE is to wake up in an upcoming active time or forgo waking up in the upcoming active time;
  transmitting a negative acknowledgement (NACK) to a different UE, wherein the NACK indicates that an attempt by the different UE to transmit a physical sidelink control channel (PSCCH) was unsuccessful; and
  starting a sidelink DRX hybrid automatic repeat request (HARD) round-trip time timer (RTT) timer based on the sidelink DRX configuration and based on transmitting the NACK to the different UE.

16. The method of claim 15, further comprising:
  switching between the access link DRX configuration and the sidelink DRX configuration based at least in part on whether sidelink communication is occurring.

17. The method of claim 15, further comprising:
  monitoring a physical downlink control channel (PDCCH) discontinuously,
    wherein the PDCCH is a PDCCH associated with sidelink communication or a PDCCH scheduling sidelink communication.

18. The method of claim 15, wherein sidelink communication is during a time period, of the sidelink resources, allocated for sidelink activity during the sidelink resource pool.

19. The method of claim 15, wherein the one or more sidelink DRX cycles include a sidelink DRX long cycle.

20. The method of claim 15, further comprising:
  receiving a radio resource control message, from a base station, conveying the information identifying the sidelink DRX configuration.

21. The method of claim 15, further comprising:
  receiving a sidelink DRX command medium access control control element, from a base station, activating the sidelink DRX configuration.

22. The method of claim 15, wherein the sidelink DRX configuration specifies that the UE is to be active during an entirety of the sidelink resource pool.

23. The method of claim 15, further comprising:
  remaining in an inactive time based at least in part on receiving the DCI type 2_6.

24. The method of claim 15, further comprising:
  starting a sidelink DRX retransmission timer based on the sidelink DRX configuration and based at least in part on an expiration of the sidelink DRX HARQ RTT timer; and
  receiving a sidelink transmission from the different UE before the sidelink DRX retransmission timer, started by the UE, expires.

25. The method of claim 15, wherein the DCI type 2_6 indicates that the UE is to forgo waking up in the upcoming active time.

26. A method of wireless communication performed by a base station, comprising:
  transmitting, to a user equipment (UE), information identifying a sidelink discontinuous reception (DRX) configuration, that is different from an access link DRX configuration, associated with operation in a sidelink communication deployment,
    wherein the access link DRX configuration defines an access link DRX cycle with one or more of a sleep state or an inactive time that completely overlaps with a sidelink resource pool providing sidelink resources, and
    wherein the sidelink DRX configuration defines one or more sidelink DRX cycles with one or more sleep periods that do not completely overlap with the sidelink resource pool;
  transmitting, to the UE, a downlink control information (DCI) type 2_6 indicating that the UE is to wake up in an upcoming active time or forgo waking up in the upcoming active time; and
  receiving, from the UE, a retransmission scheduling request after the UE receives a negative acknowledgement (NACK) from a different UE that starts a sidelink DRX hybrid automatic repeat request (HARD) round-trip time timer (RTT) timer, wherein the NACK indicates that an attempt to transmit a physical sidelink control channel (PSCCH) was unsuccessful.

27. The method of claim 26, further comprising:
communicating, using a physical downlink control channel (PDCCH), with the UE,
  wherein the PDCCH is a PDCCH associated with sidelink communication or a PDCCH scheduling sidelink communication.

28. A non-transitory computer-readable medium storing a set of instructions for wireless communication, the set of instructions comprising:
  one or more instructions that, when executed by one or more processors of a user equipment (UE), cause the UE to:
    receive information identifying a sidelink discontinuous reception (DRX) configuration that is different from an access link DRX configuration,
      wherein the access link DRX configuration defines an access link DRX cycle with one or more of a sleep state or an inactive time that completely overlaps with a sidelink resource pool providing sidelink resources, and
      wherein the sidelink DRX configuration defines one or more sidelink DRX cycles with one or more sleep periods that do not completely overlap with the sidelink resource pool;
    receive, during a sidelink DRX operation that is based on the sidelink DRX configuration, a downlink control information (DCI) type 2_6 indicating that the UE is to wake up in an upcoming active time or forgo waking up in the upcoming active time;
    transmit a negative acknowledgement (NACK) to a different UE, wherein the NACK indicates that an attempt by the different UE to transmit a physical sidelink control channel (PSCCH) was unsuccessful; and
    start a sidelink DRX hybrid automatic repeat request (HARD) round-trip time timer (RTT) timer based on the sidelink DRX configuration and based on transmitting the NACK to the different UE.

29. The UE of claim 1, wherein the one or more processors are further configured to cause the UE to:
  start a sidelink DRX retransmission timer based on the sidelink DRX configuration and based at least in part on an expiration of the sidelink DRX HARQ RTT timer.

30. The UE of claim 29, wherein the one or more processors are further configured to cause the UE to:
  receive a sidelink transmission from the different UE before the sidelink DRX retransmission timer, started by the UE, expires.

\* \* \* \* \*